United States Patent [19]
Barlow et al.

[11] Patent Number: 5,289,478
[45] Date of Patent: Feb. 22, 1994

[54] METHOD AND MEANS FOR VERIFICATION OF WRITE DATA

[75] Inventors: Howard L. Barlow; Kirk M. Enochs, both of Boulder; Alexander Troicky, Longmont, all of Colo.

[73] Assignee: Fujitsu Limited, Japan

[21] Appl. No.: 668,107

[22] Filed: Mar. 11, 1991

[51] Int. Cl.⁵ .................. G06F 11/08; G11C 29/00
[52] U.S. Cl. .................................................. 371/40.1
[58] Field of Search ............... 371/40.1, 40.2, 40.3, 371/37.4

[56] References Cited

U.S. PATENT DOCUMENTS

| | | | |
|---|---|---|---|
| Re. 34,100 | 10/1992 | Hartness | 371/40.1 |
| 3,786,439 | 1/1974 | McDonald | 371/37.4 X |
| 3,831,143 | 8/1974 | Trafton | 371/37.4 |
| 4,211,997 | 7/1980 | Rudnick et al. | 371/38 |
| 4,276,646 | 6/1981 | Haggard | 371/37.4 |
| 4,281,355 | 7/1981 | Wada | 371/37.4 X |
| 4,380,029 | 4/1983 | Bode | 360/48 |
| 4,398,292 | 8/1983 | Doi | 371/37.4 |
| 4,612,640 | 9/1986 | Mehrotra | 371/40.1 |
| 4,769,819 | 9/1988 | Matsutani | 371/37.4 |
| 4,775,978 | 10/1988 | Hartness | 371/40.1 |
| 4,876,616 | 10/1989 | Katsumata et al. | 360/53 |
| 4,926,426 | 5/1990 | Scheuneman | 371/40.1 |

FOREIGN PATENT DOCUMENTS 0176218  4/1986  European Pat. Off. ........... 371/40.1

Primary Examiner—Robert W. Beausoliel, Jr.
Assistant Examiner—Glenn Snyder
Attorney, Agent, or Firm—Sheridan, Ross & McIntosh

[57] ABSTRACT

A system for verifying write data includes a host computer, a controller having a write data path network and a read data path network, and a disk drive array for storing write data. The host computer provides host cyclic redundancy check characters that are appended to blocks of input write data. The write data blocks are divided into subblocks that are processed through separate channels and ports. Port cyclic redundant check characters are appended to each data subblock, including a parity subblock. The read data path network is coupled to receive the data subblocks with the appended host and port cyclic redundancy check characters from the write data path network means and has error detection circuitry for verifying the write data during the write mode.

14 Claims, 3 Drawing Sheets

THE FOLLOWING HOST DATA BLOCK:

HOST DATA: (01, 02, 03, 04, 05, 06, 07, 08, 09, 0A, 0B, 0C, 0D, 0E)

HOST CRC: (EF, FD)

IS PROCESSED BY THE CDP AS FOLLOWS:

|  | HOST DATA/HOST CRC | | | | | PORT CRC | |
|---|---|---|---|---|---|---|---|
| RANK = | 1 | 2 | 3 | 4 | | 5 | 6 |
| D0(x) = ( | 01 | 05 | 09 | 0D | ) MOD g(x) = r(x)= | 22 | 6A |
| D1(x) = ( | 02 | 06 | 0A | 0E | ) MOD g(x) = r(x)= | 14 | 5C |
| D2(x) = ( | 03 | 07 | 0B | EF | ) MOD g(x) = r(x)= | 84 | 0D |
| D3(x) = ( | 04 | 08 | 0C | FD | ) MOD g(x) = r(x)= | FA | AD |
| Dp(x) = ( | 04 | 0C | 04 | 11 | ) MOD g(x) = r(x)= | 48 | 96 |
| CHECKSUM = | 00 | 00 | 00 | 00 | | 00 | 00 |

NOTE: RANK 4, EF, FD, AND ALL CHARACTERS IN RANKS 5 AND 6 ARE CRC CHARACTERS.

FIG. 5

METHOD AND MEANS FOR VERIFICATION OF WRITE DATA

FIELD OF THE INVENTION

This invention relates to the verification of write data and in particular to write data verification in a fault tolerant disk drive array.

BACKGROUND OF THE INVENTION

1. Description of the Prior Art

Presently known systems for recording binary data typically include a host computer for processing data, one or more disk drives and a controller interfacing between the computer and the disk drives. With some systems that process relatively large amounts of data, a plurality of drives are configured in an array for recording and storing data. A disk array generally consists of a number of disk drives and one or more redundant drives. Fault tolerant disk arrays are used that allow failure of one or more disk drives in an array without loss of data. Such types of disk arrays are used when data availability is critical. In one method, fault tolerance is achieved by calculating simple parity for the system data and storing it on the redundant drive(s). The reconstruction of data for a bad block requires the existence of parity data for that block, knowledge in the controller of the location of the bad block, and no more than one bad data block per parity block.

It is well known that the most common failure events which occur with the use of fault tolerant disk arrays are recoverable. Since fault tolerant disk arrays are employed for critical data applications, less common failure events affecting data integrity assume a much higher importance as compared to nonfault tolerant disk systems. Thus controller failures, even though much less likely than drive failures, may lead to data loss that is unacceptable. Although controller failure during a read operation leads to the lack of availability of system data, there is no permanent loss of the data. The faulty controller can be replaced and the data recovered. On the other hand, a controller failure during a write operation, if undetected, can cause a corruption of the system data on the drives. Such corruption of data would not be detected until the bad block is subsequently read. If there is a significant time lag between the write and read operations, additional bad blocks could be written in the interim. In a worst case situation, a controller failure during a write operation may never be detected in the controller. For example, if the controller scrambles data when writing to the disks and parity data is generated for the scrambled data, an undetectable and uncorrectable write failure would occur.

Typical controller architecture has two exposures to write data loss events, namely (1) an undetected failure of the 22 controller data path function; and (2) an undetected failure in one of the drive data paths. Even though the drive data paths are fault tolerant in a disk array, a bad block must be detectable in order for it to be correctable. Typical disk controllers protect against write data loss events by reading and checking the data just written. This form of "write verification" in disk controllers requires an additional revolution of the disks in order to perform the read operation, which constitutes a significant performance penalty and therefore is not generally attempted. Furthermore, guaranteed detection of a write failure in a drive data path is difficult to implement and rarely achieved in disk array systems.

One well known error detection approach uses cyclic redundancy check (CRC) characters for detection of data path errors. Presently known disk systems require CRC generation circuitry and separate additional independent circuitry for detecting data errors. This duplication of circuitry is relatively expensive. It is highly desirable to provide integrity checking in the controller during the write mode using simplified circuitry.

SUMMARY OF THE INVENTION

An object of this invention is to achieve verification of write data for fault tolerant disk arrays without the performance penalty incurred in typical disk controllers due to a read of the previously written data.

Another object of this invention is to provide a verification system that detects loss of write data or failure in the controller data path during a write operation.

Another object is to provide a verification system including a disk array that detects loss of write data or failure during the write mode without duplication of circuitry in the write and read data circuits.

According to this invention, verification of write data is achieved by detection of error in the controller data path (CDP) during a write operation in a fault tolerant disk array system. The CDP is separated into a write data path (WDP) and a read data path (RDP), which operate independently of each other. The RDP is enabled during a write operation to read output data from the WDP and to implement detection of data error in the controller. If no error is detected in the write data exiting the WDP, we are assured of being able to subsequently read it because of the fault tolerance in disk drive data paths.

In operation, cyclic redundancy check (HOST CRC) characters are generated and added to the host write data. The HOST CRC characters are used in two ways. First, they are regenerated and checked in the RDP during write operations as an overall check of the WDP processing of the host data block. Second, the HOST CRC characters are stored on the drives to be used on subsequent read operations as an overall check of the RDP as it rebuilds the host data block. The combined host data block and HOST CRC is divided into multiple data blocks by the WDP, one block per drive. The controller then generates additional cyclic redundancy check (PORT CRC) characters which are appended to each block and stored on the drives. The PORT-CRC characters are regenerated during read operations and compared to the stored characters. If a disk drive data path has failed during a write or read operation, the PORT CRC check can be used as a pointer to the failed data path. The read data can then be reconstructed from the other good disk drives in a well known manner. This feature provides fault tolerance on read operations. The blocks having write data with HOST and PORT CRC characters are fed to the ports of a plurality of disk drives, which includes a parity drive for processing redundancy data. Simultaneously, error detection circuitry in the RDP checks the host data, redundant data, and the HOST CRC and PORT CRC characters to detect errors in the write data from the WDP.

In a specific implementation of RDP error detection circuitry, there is no need for duplication of PORT CRC generating circuitry in the RDP thus simplifying the write verification system and reducing cost of manufacture and maintenance expense. Instead, the individual data blocks are checked by summing the contribution of each port. The resulting sum is checked and if a failure is indicated, the write operation is retried.

BRIEF DESCRIPTION OF THE DRAWINGS

The invention will be described in greater detail with reference to the drawing in which:

FIG. 5 is an example of a host data block transfer as the system in FIG. 1 sends it to a disk array.

DETAILED DESCRIPTION OF THE INVENTION

Figure 1:
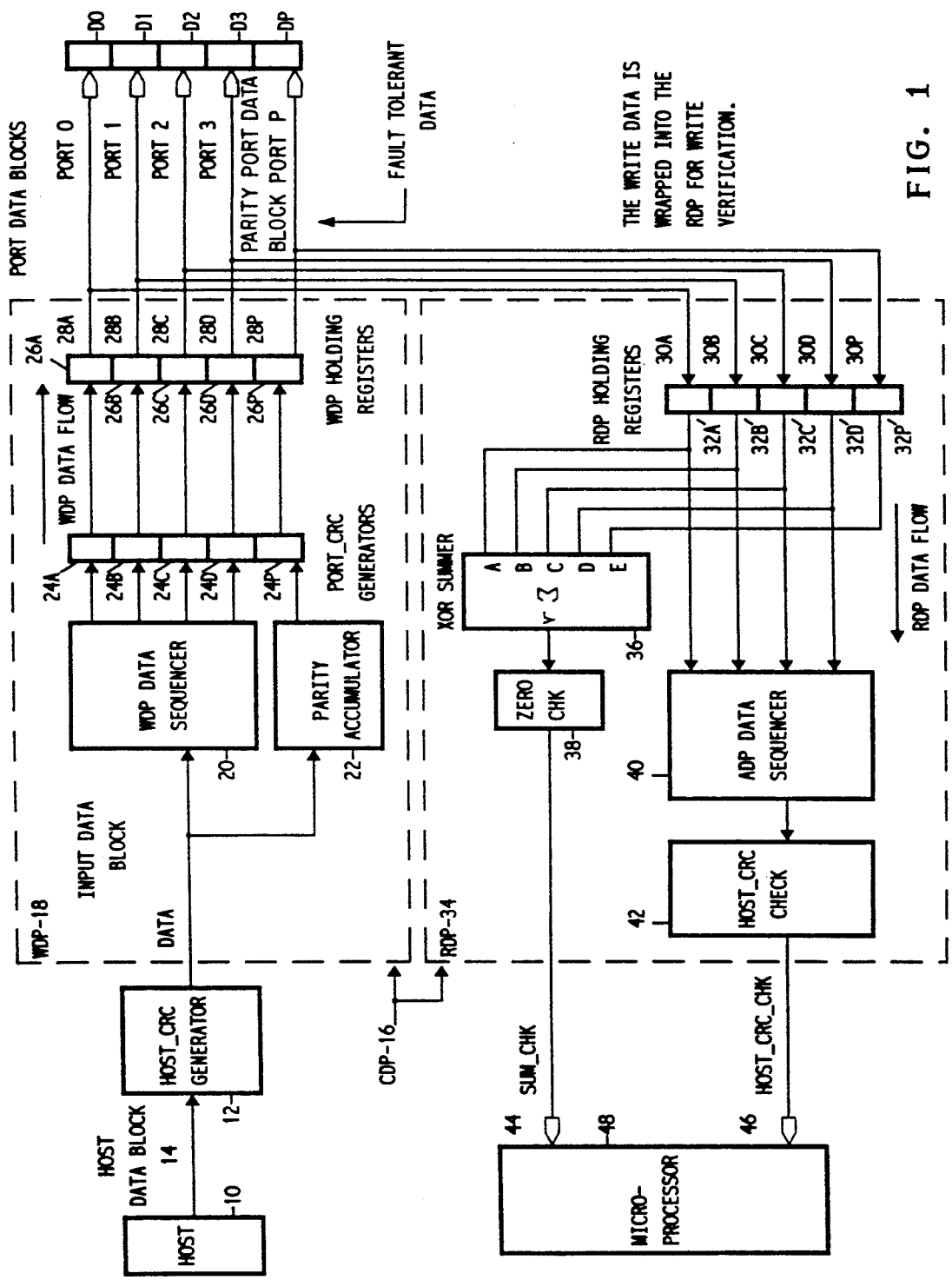
FIG. 1 is a schematic circuit block diagram of a write data verification system, illustrating independent write data and read data paths, in accordance with this invention.

With reference to FIG. 1, a write verification system comprises a host computer 10 that processes binary data, and a controller 16 including a write data path (WDP) network 18 and a read data path (RDP) network 34. The WDP network 18 and RDP network 34, although connected, function independently to process write data and read data respectively. The RDP network 34 is enabled during the write mode to read output data from the WDP network 18.

WRITE DATA PATH DESCRIPTION

Host computer 10 provides blocks of host data to be passed to the controller 16 and to an array of disk drives D0-D3, DP for recording of the data. The computer 10 includes a generator 12 that generates a number of bytes of host cyclic redundancy check (HOST CRC) characters which are appended to each block of write data received at input terminal 14. The HOST CRC generator 12 does not need to reside in the host computer, but could just as easily reside in the controller 16 and equivalent results would be achieved.

Figure 4:
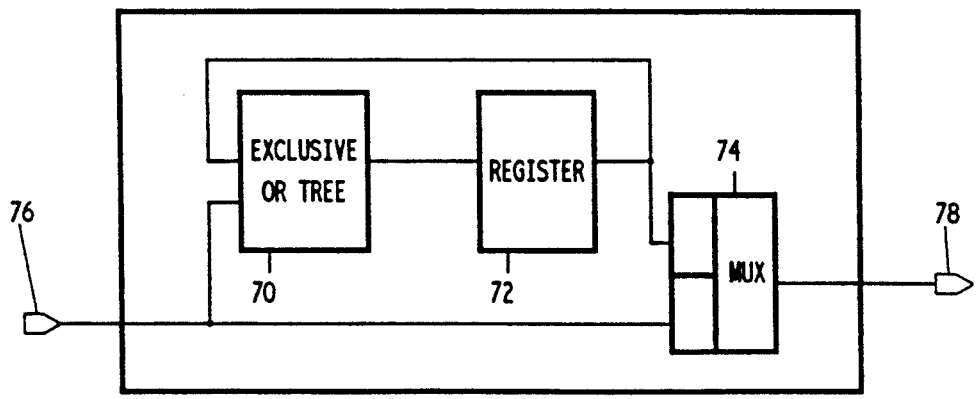
FIG. 4 is a schematic circuit diagram of the CRC generator such as used in the WDP and RDP of the system of FIG. 1.

The HOST CRC generator 12 is shown in more detail in FIG. 4. As host data is received on input 76 and passed to output 78, the exclusive OR tree 70 and register 72 are operated in a well known manner such that the input data is divided by a generator polynomial and the remainder is computed. After a block of HOST data has passed through the generator 12, the multiplexer 74 is switched so as to append the remainder (which is now known as HOST CRC) onto the host data out of 78. This cycle is repeated for each block of host data.

As illustrated in FIG. 1, the write data block with the appended HOST CRC characters is directed to the WDP network 18. The block of input data from the host computer 10 and the HOST CRC characters are divided by a data sequencer 20 into a plurality of subblocks of port data, preferably of equal size. In this implementation, four data subblocks are passed respectively to PORT CRC generators 24a,b,c,d.

Concurrently the write input data from the host computer 10 is channeled to a parity accumulator 22 that calculates the redundancy data for the parity port, which is subsequently passed to PORT CRC generator 24p.

In accordance with this invention, PORT CRC characters are appended to the data and parity subblocks by PORT CRC generators 24a,b,c,d,p. The PORT CRC generators are implemented with the same type of circuit as the HOST CRC generator circuit shown in FIG. 4. As each data byte is presented to one of the PORT CRC generators 24a,b,c,d,p for PORT CRC calculation, the byte is also passed through to the corresponding WDP holding register 26a,b,c,d,p. When each port data block has been completed, two PORT CRC bytes are immediately transferred following the last port data byte to the respective WDP holding register 26. The data and parity subblocks are transferred from the WDP holding registers to the respective disk drives D0-D3,Dp. The purpose of each holding register 26a,b,c,d,p is to provide temporary storage of data before the data can be sent to the respective disk drive.

Figure 2:
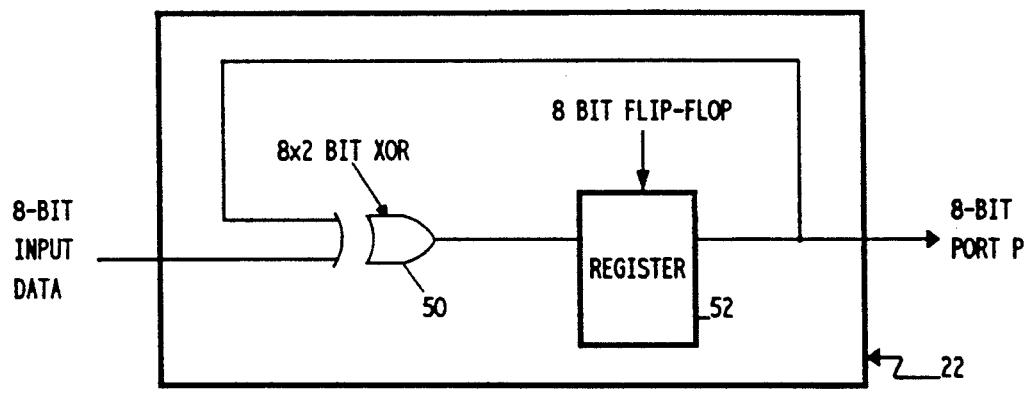
FIG. 2 is a schematic circuit diagram of a parity accumulator, such as used in the write data path of the system of FIG. 1.

During operation of the system, each of four consecutive host data bytes are summed by modulo 2 summation in the parity accumulator 22, and the resulting sum is fed to PORT CRC generator 24p. As an example, the first group of eight bytes of host write data may be designated as 01,02,03,04,05,06,07,08. The first byte 01 of 8 bits is transferred to PORT CRC generator 24a, WDP holding register 26a and, simultaneously to an exclusive OR (XOR) logic circuit 50 of the accumulator 22, as illustrated in FIG. 2. The byte value 01 is summed with the initial value 00 to produce a resultant 01. The second byte 02 is transferred to PORT CRC generator 24b and register 26b, and simultaneously summed with the current value 01 in accumulator 22 (01 xor 02=03). Byte 03 is transferred to PORT CRC generator 24c, register 26c, and simultaneously summed (03 xor 03=00). Byte 04 is transferred to PORT CRC generator 24d, register 26d and simultaneously summed (00 xor 04=04). At this point the value of the byte in the parity accumulator 22 is transferred to PORT CRC generator 24p and register 26p. These five bytes, 01-04 and the parity byte, represent the first rank of data. A port rank corresponds to the set of bytes over which the parity byte is calculated, and the parity byte itself.

The accumulator 22 is reinitialized to 00 and the above sequence is repeated for every four bytes of input data. The transfer of data is continued by transfer of byte 05 to PORT CRC generator 24a, holding registers 26a, and simultaneous summing with the initialized 00 value (00 xor 05=05). Then byte 06 is transferred to PORT CRC generator 24b, holding register 26b, and is simultaneously summed (05 xor 06=03). Byte 07 is transferred to PORT CRC generator 24c, holding register 26c, and is simultaneously summed (03 xor 07=04). Byte 08 is transferred to PORT CRC generator 24d, holding register 26d, and is simultaneously summed (04 xor 08=0C). The parity byte 0C is then transferred to PORT CRC generator 24p, holding register 26p, and the accumulator is reinitialized to 00. The second rank therefore consists of the five bytes 05, 06, 07, 08, and the parity byte 0C.

This sequence is repeated until the entire host data block including HOST CRC characters has been transferred. The WDP Data Sequencer 20 divides the host data block including HOST CRC into fourths and the parity port data is calculated from the host data. A system clock (not shown) is used to time the sequential transfer of the data bytes or subblocks.

After each host data block including HOST CRC characters has been processed in the above manner, the PORT CRC characters that are generated in PORT CRC generators 24a,b,c,d,p are passed respectively to WDP holding registers 26a-d,p. The data and parity subblocks with appended HOST CRC and PORT CRC characters are then fed through terminals 28a-d,p to PORT0-PORT3 and PORTP to respective data disk drives D0-D3 and parity disk drive Dp for storage.

READ DATA PATH DESCRIPTION

In keeping with this invention, the data subblocks and redundant or parity subblock are fed back through terminals 30a-30d,p to the network 34 constituting the read data path (RDP). The port data and parity data are provided to holding registers 32a-d,p. Each holding register provides temporary storage of data. The stored data contents of the RDP holding registers 32a-d,p are passed to a 5 byte XOR summer 36 to produce a sum check across each rank, bytes 0-3,p for the entire data block. The output of the summer 36 is directed to a zero check circuit 38 which checks the result of the summing operation to be equal to 0 for each rank, bytes 0-3,p. If the sum is non-zero an error flag is set in a status register of the controller 16. The microprocessor 48 has access to the error flag. If the error flag is set after the write operation, the transfer is considered incorrect and the microprocessor initiates a retry. It should be noted that five 8-bit input data lines are connected between the outputs of the holding registers 32a-d,p and the inputs to xor summer 36, although FIG. 1 shows single lead lines for convenience and simplicity.

Figure 3:
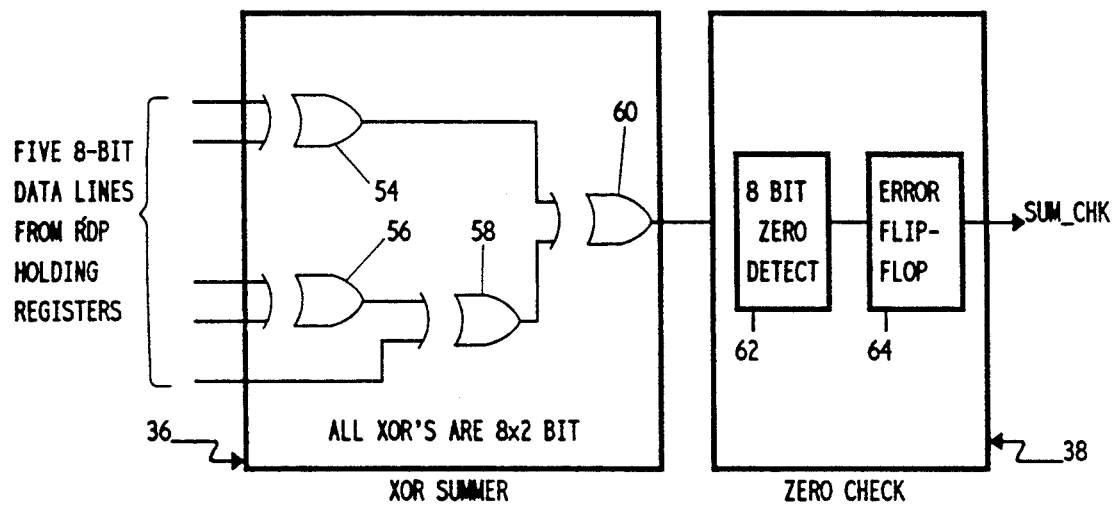
FIG. 3 is a schematic circuit diagram of error detection circuitry useful for verifying write data, including an exclusive OR summer and zero check circuit, such as employed in the read data path of the system of FIG. 1.

In FIG. 3, an example of detection circuitry comprising the xor summer 36 and zero check circuit 38 is illustrated. Five data lines, each carrying 8-bit data bytes, are applied to xor circuits 54, 56 and 58. Xor circuit 58 receives an 8-bit output from xor 56 as well as the 8- bit data byte from the holding register 32. The outputs of xor circuits 54 and 58 are supplied to xor circuit 60, which provides an 8-bit byte to the zero check circuit 38, having a zero detect circuit 62 and flip-flop 64. The output from the flip-flop 64 is an error flag which is set if the zero check circuit detects a non-zero result. The microprocessor 48 has access to the error flag. If the error flag 44 is set after the write operation, the transfer is considered incorrect and the microprocessor initiates a retry.

As shown in FIG. 1, the port subblocks provided to the RDP holding registers 32a-d are also provided to an RDP data sequencer 40 that sequentially channels the data subblocks to a HOST CRC check circuit 42 under control of the system clock. The data is reassembled in the RDP data sequencer 40 in the same sequence as it was provided by the host computer to the WDP. The sequence must be the same in order to regenerate the correct HOST CRC in the check circuit 42. The regenerated CRC value is compared to the HOST CRC characters. If the regenerated value is not the same as the HOST CRC, an error flag 46 is set in a status register of the controller 16. The microprocessor 48 has access to the error flag. If the error flag is set after the write operation, the transfer is considered incorrect and the microprocessor initiates a retry.

It should be noted that the HOST CRC check circuit 42 performs the same function as the HOST CRC generator 12 as illustrated in FIG. 4 with the exception that the HOST CRC characters appended to the host data block are included in the checker's calculation. Also the result of the calculation is checked to be equal to zero at the end of the host data block.

A failure in the write data path causes the overall checks to fail in the read data path and the write operation is then immediately retried. If the RDP does not detect an error in the write data then the data and appended check characters are deemed to be fault tolerant. Fault tolerance allows any single drive path or drive to fail without loss of host data.

Since the host data block is checked by a HOST CRC, any error in the controller data path which occurs during the host data transfer will be detected. However since the PORT CRC characters are appended to the port data blocks after the HOST CRC, if an error occurs in the generation of the PORT CRC characters or when they are appended, the HOST CRC would not detect such errors during the write operation. An additional check is required to allow the detection of an error produced during port data block PORT CRC generation. One approach would be to duplicate the PORT CRC hardware in the RDP for each port, which would be relatively expensive and complex. For this example five check circuits similar to the circuit depicted in FIG. 4 would need to be duplicated in the RDP.

In an embodiment of this invention, a simple and efficient sum check of the PORT CRC characters is provided by using the linear properties of CRC polynomial operations. The sum of the individual data PORT CRC's and the parity PORT CRC will always be zero. In this implementation, the parity PORT CRC is generated from the parity port data and not from the sum of the individual data PORT CRC characters.

Each PORT CRC is the remainder of the division operation performed on each data subblock by the CRC polynomial defined as follows:

$$PORT\ CRC = r(x) = D(x)\ MOD\ g(x)$$

where
r(x) = Remainder polynomial;
D(x) = Data polynomial;
q(x) = CRC generator polynomial
MOD = CRC MODULO 2 division For this example there are four data polynomials divided by the CRC polynomial: D0(x), D1(x), D2(x), D3(x)—one for each port data subblock. The remainder of the division operations are the PORT CRC's appended to the data polynomials.

PORT CRC0 = r0(x) = D0(x) MOD g(x)
PORT CRC1 = r1(x) = D1(x) MOD g(x)
PORT CRC2 = r2(x) = D2(x) MOO g(x)
PORT CRC3 = r3(x) = D3(x) MOD g(x)

The data polynomial of the parity port subblock (Dp(x)) is the MODULO-2 sum(xor) of the other ports' data polynomials:

$$Dp(x) = D0(x) + D1(x) + D2(x) + D3(x)$$

The remainder polynomial of the parity subblock is:

$$rp(x) = (D0(x) + D1(x) + D2(x) + D3(x))\ MOD\ g(x)$$

By superposition:

$$rp(x) = D0(x) \, MOD \, g(x) + D1(x) \, MOD \, g(x) + D2(x) \, MOD \, g(x) + D3(x) \, MOD \, g(x)$$

By substitution:

$$rp(x) = r0(x) + r1(x) + r2(x) + r3(x)$$

Or:

$$rp(x) + r0(x) + r1(x) + r2(x) + r3(x) = 0$$

This expression shows that the sum of the individual data PORT CRC's and the parity PORT CRC will be 0.

FIG. 5 illustrates an example of a 14 byte HOST DATA block with two bytes of HOST CRC appended, as follows:
HOST DATA: (01, 02, 03, 04, 05, 06, 07, 08, 09, 0A, 0B, 0C, 0D, 0E)
HOST CRC: (EF, FD)

The HOST DATA block is divided into four DATA subblocks. The parity subblock is generated from the HOST DATA. The parity subblock PORT CRC is calculated independently of the other PORT CRC characters.

The first rank of data consists of the HOST DATA block bytes 01, 02, 03, 04 and parity subblock byte 04. PORT O data subblock consists of the host data block bytes 01, 05, 09, 0D, and PORT CRC bytes 22 and 6A as generated by the PORT CRC generator 24a. Each byte of the parity subblock is the xor sum across the corresponding data subblocks excluding the PORT CRC ranks 5 and 6. The parity PORT CRC as generated by 24p is calculated from the parity port data bytes 04, 0C, 04, 11. The sum across ranks 5 and 6 (PORT CRC ranks) should be zero:

22 xor 14 xor 84 xor FA xor 48 = 00, and
6A xor 5C xor 0D xor AD xor 96 = 00.

By virtue of this invention, an improved write verification system is provided wherein a sum check of the port CRCs takes advantage of the linear properties of CRC polynomials by individually summing the data port CRCs and the parity port CRC as a means to check the correct generation of port CRCs while simplifying the hardware design. The disclosed invention affords the checking of data blocks simultaneously with the recording and storage of data in a fault tolerant disk drive array.

The embodiment of the invention described herein is intended to be illustrative and it should be understood that the description is only one way of implementing the invention and is not meant to exclude others. For example, a byte for byte comparison could be performed between the WDP and RDP data as an alternative method for checking the write operation. In addition, while the invention is described with reference to a controller connected to disk drives, it is applicable to any controller connected in a fault tolerant way to any type of data processing and storage device.

What is claimed is;

1. A system for verifying write data to be recorded in a fault tolerant disk drive array having at least a first rotatable disk for receiving data during at least a first revolution thereof comprising;

a host interface for providing input blocks of write data, a means for generating host error check characters appended to said write data blocks;

a controller coupled to said interface, said controller including a write data path network and a read data path network coupled to the output of said write data path network, said read data path network being operated independently of said write data path network;

said write data path network including means for dividing said data blocks into subblocks to be passed through respective ports, and port generator means for appending port error check characters to said data subblocks;

said read data path network including first means for checking said host error check characters and second means for checking said port error check characters, said read data path network being enabled when said data subblocks are being written to the disk array, said read data path network receiving said data subblocks only from said write data path network and not from the disk array, when said read data path network is enabled during writing of said data subblocks to the disk array, said read data path network, including said first and second means for checking, being used in making a determination related to validity of said data subblocks, wherein said validity determination is made during the same revolution of the first disk as said data subblocks are being written to the first disk, said read data path network further including means for providing data validity information related to the validity of said data subblocks, said data validity information indicating at least one invalid data subblock when a determination is made as to said one data block's invalidity;

processing means communicating with said means for providing for using said data validity information to control said write data path network to re-send another data subblock based on said one invalid data subblock to the disk array.

2. A system as in claim 1, wherein said write data path network includes redundancy means coupled to said host interface for receiving said input data and for calculating redundancy subblocks to be passed through respective ports, and port generator means for appending port cyclic redundancy check characters to said redundancy subblocks.

3. A system as in claim 1, wherein said write data path network comprises write data holding registers respectively coupled to said port generator means for temporarily storing respective subblock data including redundancy subblock data.

4. A system as in claim 3, including terminal means comprising a number of terminals coupled to respective ones of said holding registers, and a plurality of disk drives coupled to respective ones of said terminals.

5. A system as in claim 4, wherein said plurality of disk drives includes at least one redundant disk drive for storing redundancy data, said redundant disk drive being coupled to a redundant port terminal means.

6. A system as in claim 4, including a feedback path between said write data path network and said read data path network.

7. A system as in claim 6, wherein said feedback path includes said terminal means, and said read data path network includes a number of read data holding registers coupled to said terminal means for temporarily storing said subblock data received from said terminal means; and a data sequencer for sequentially channeling said data subblocks including said redundant subblock stored in said holding registers.

8. A system as in claim 7, wherein said host error check characters include host cyclic redundancy check characters and said first checking means comprising a host cyclic redundancy checking circuit that is coupled to said data sequencer for checking said host cyclic redundancy check characters.

9. A system as in claim 1, wherein said port error check characters include port cyclic redundancy check characters and said second checking means includes an exclusive OR summer for summing said port cyclic redundancy check characters and a zero check circuit tied to said summer for checking said sum of said port cyclic redundancy check characters.

10. A system as in claim 9, wherein said summer includes means for summing groups of consecutive host data bytes by modulo 2 summation.

11. A method for verifying write data to be recorded in a fault tolerant disk drive array having at least a first rotatable disk for receiving data during at least one revolution thereof comprising the steps of:
providing blocks of write data;
generating host error check characters appended to said write data blocks;
dividing said data blocks into subblocks to be passed through respective ports;
appending port error check characters to said data subblocks;
sending said data subblocks to the disk array from a write data path network;
storing said data subblocks using the first disk and during one revolution thereof;
enabling a read data path network at the same time said data subblocks are being sent to the disk array;
receiving said data subblocks from said write data path network and not from the disk array, when said read data path network is enabled during sending of said data subblocks to the disk array;
checking said host error check characters and said port error check characters in said read data path network;
making a determination in said read data path network as to validity of said data subblocks during said same one revolution of the first disk;
storing data validity information related to said data subblocks;
checking said data validity information using processing means;
controlling said write data path to re-try sending valid data subblocks when said checking indicates that at least one of said data subblocks is not valid.

12. A method as in claim 11 including the steps of receiving said input write data; calculating redundancy subblocks to be passed through respective ports; and appending port cyclic redundancy check characters to said redundancy subblocks.

13. A method as in claim 11 including the step of temporarily storing subblock write data and redundancy subblock data.

14. A method as in claim 11 including the step of summing groups of consecutive host data bytes by modulo 2 summation.

* * * * *